No. 840,117. PATENTED JAN. 1, 1907.
G. W. DONNING.
RECORD PRODUCING MACHINE.
APPLICATION FILED MAY 15, 1902.
10 SHEETS—SHEET 1.
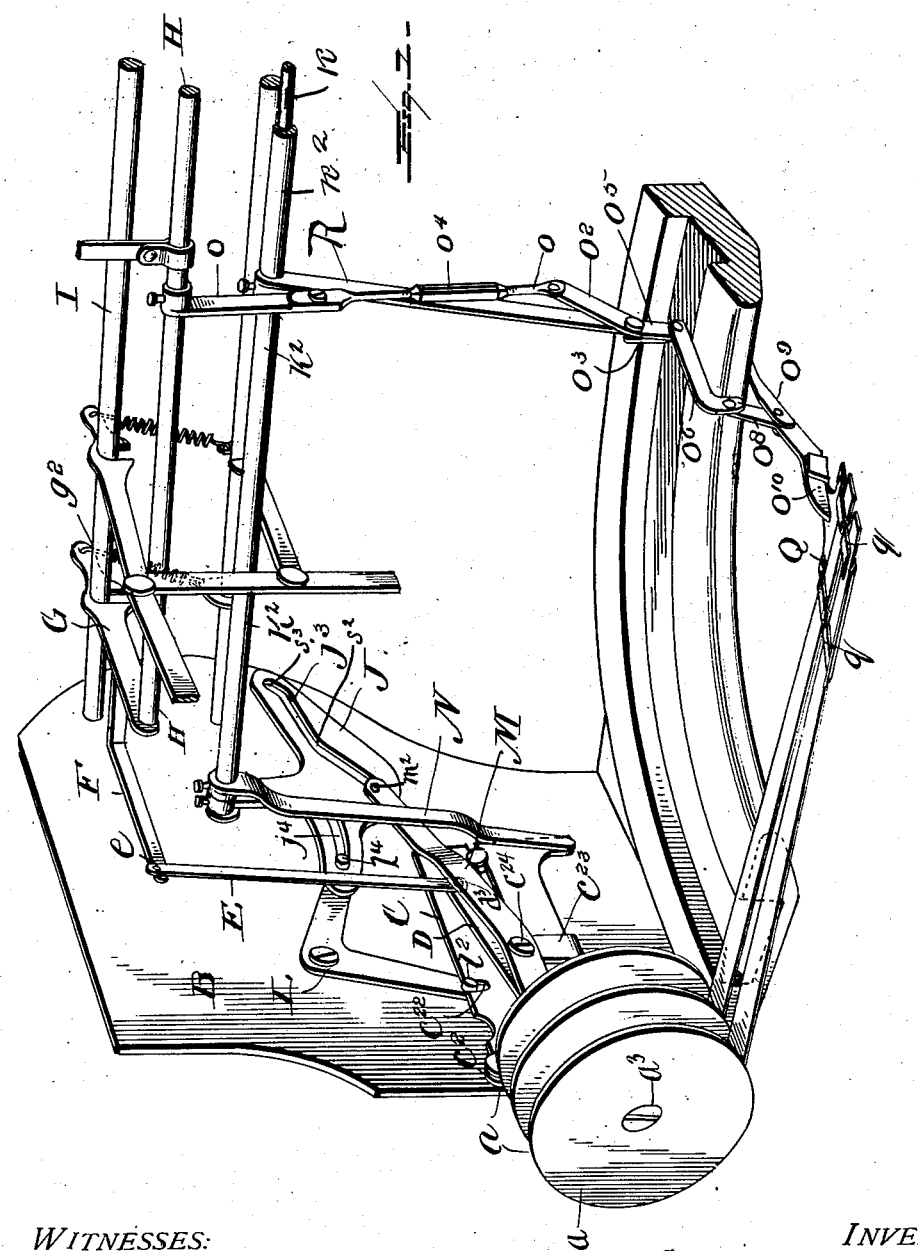
WITNESSES:
INVENTOR
George W. Donning,
by
Attorney No. 840,117. PATENTED JAN. 1, 1907.
G. W. DONNING.
RECORD PRODUCING MACHINE.
APPLICATION FILED MAY 15, 1902.
10 SHEETS—SHEET 2.
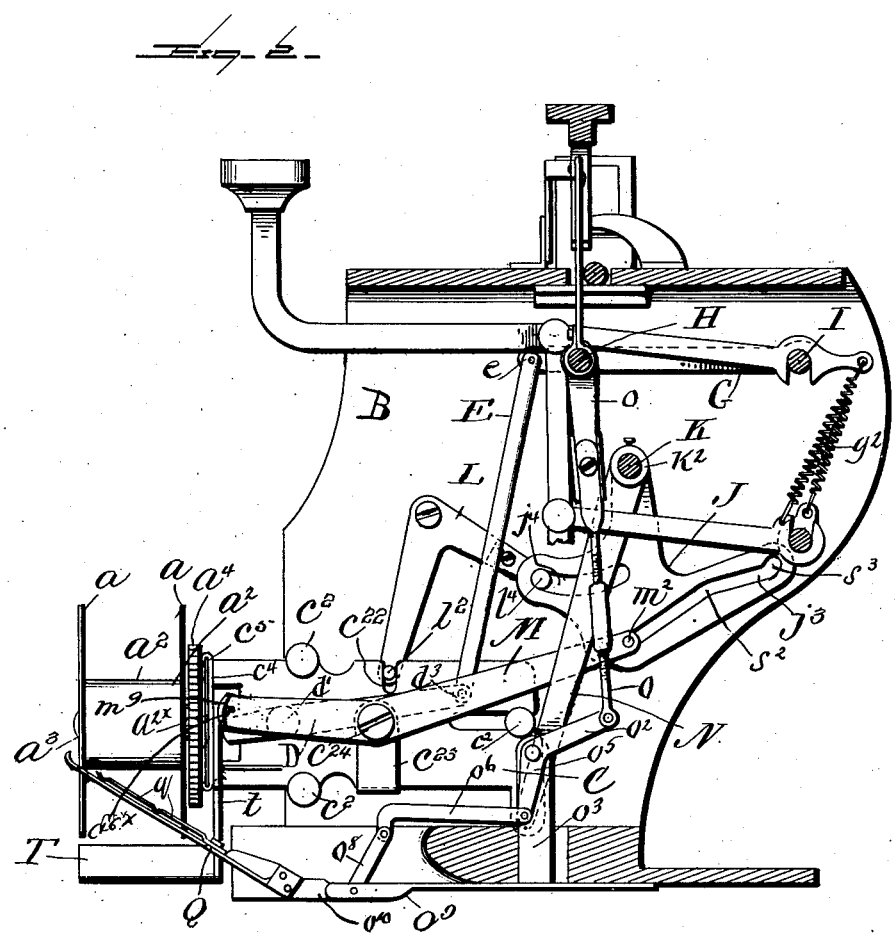

No. 840,117. PATENTED JAN. 1, 1907.
G. W. DONNING.
RECORD PRODUCING MACHINE.
APPLICATION FILED MAY 15, 1902.
10 SHEETS—SHEET 3.
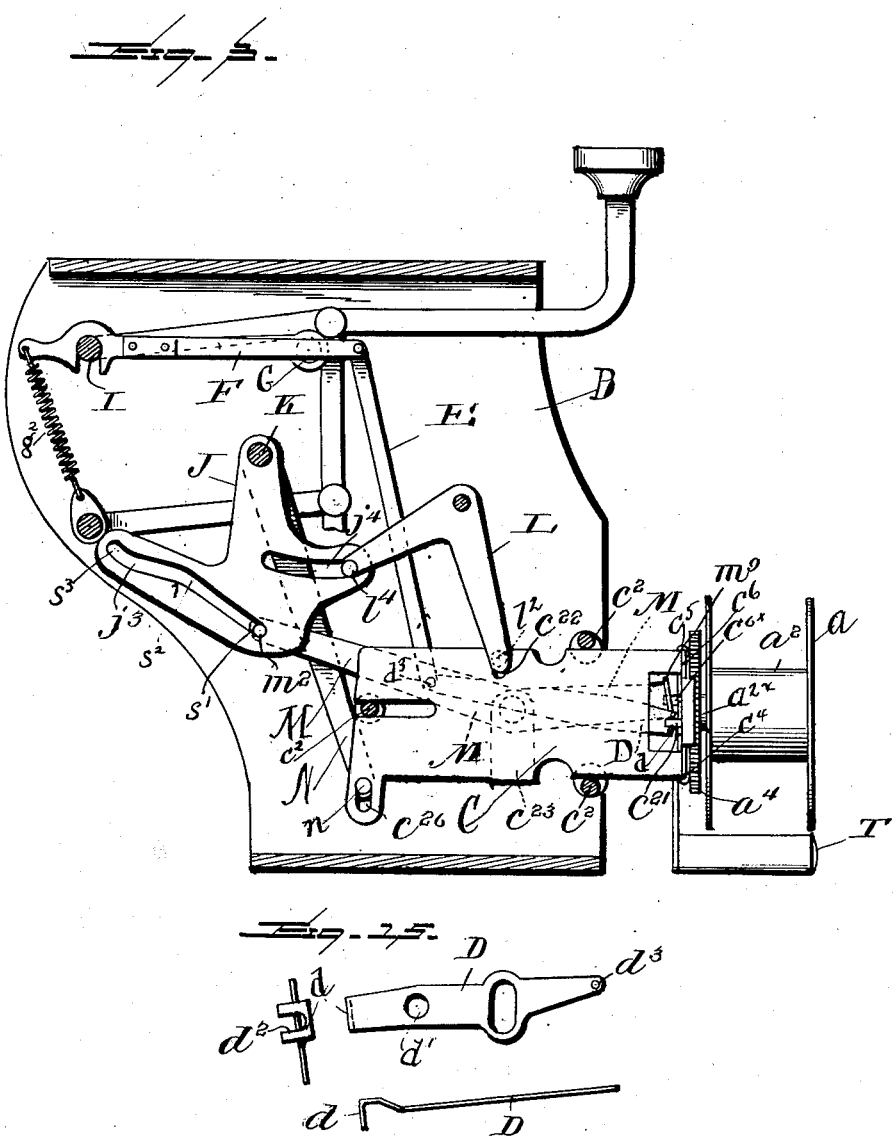
WITNESSES:
INVENTOR
George W. Donning.
by his attorney No. 840,117. PATENTED JAN. 1, 1907.
G. W. DONNING.
RECORD PRODUCING MACHINE.
APPLICATION FILED MAY 15, 1902.
10 SHEETS—SHEET 4.
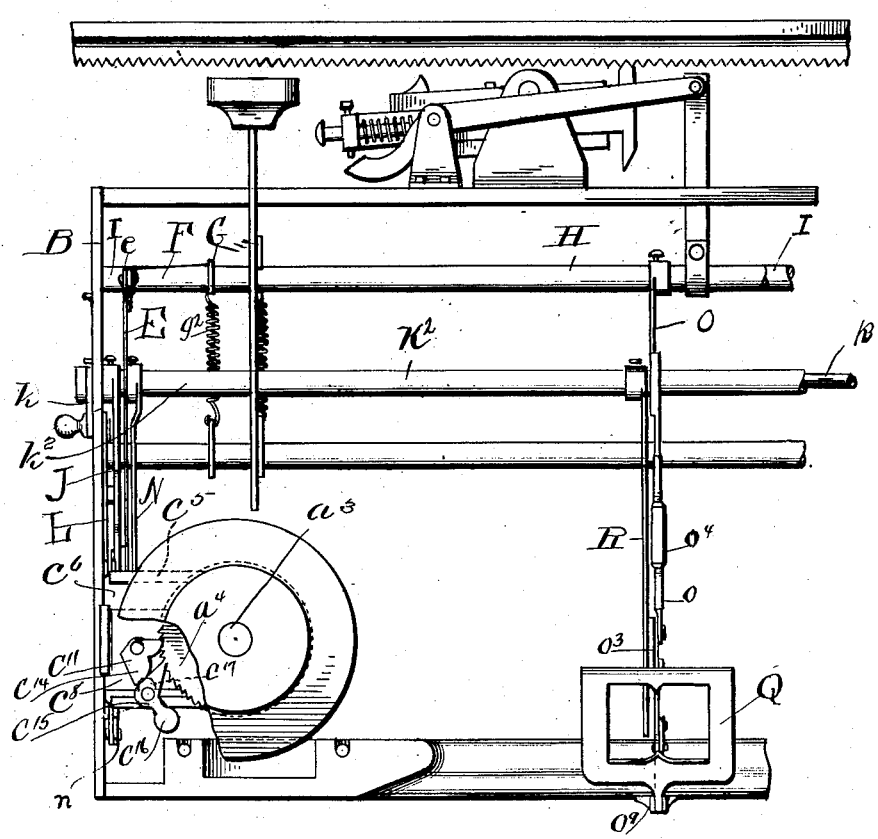
WITNESSES:
INVENTOR
George W. Donning,
by his attorney No. 840,117. PATENTED JAN. 1, 1907.
G. W. DONNING.
RECORD PRODUCING MACHINE.
APPLICATION FILED MAY 15, 1902.
10 SHEETS—SHEET 5.
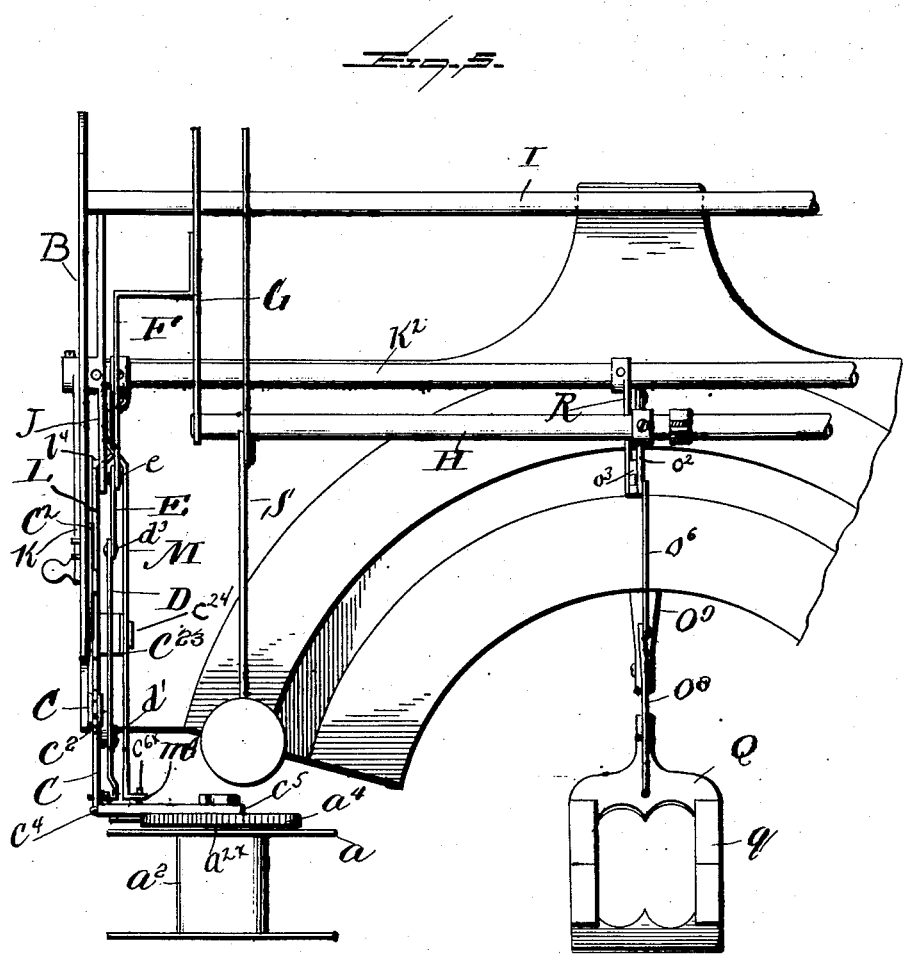
WITNESSES:
INVENTOR
George W. Donning,
by his attorney No. 840,117. PATENTED JAN. 1, 1907.
G. W. DONNING.
RECORD PRODUCING MACHINE.
APPLICATION FILED MAY 15, 1902.
10 SHEETS—SHEET 6.
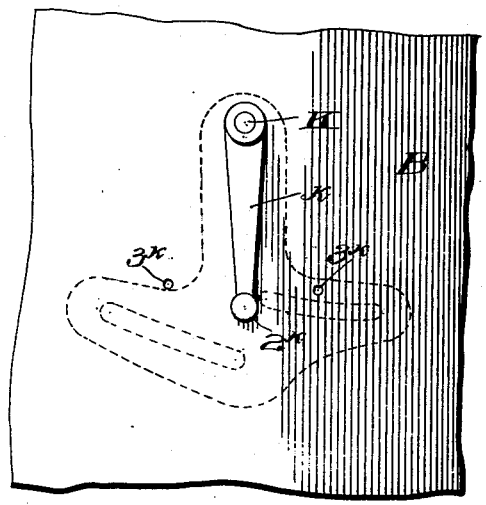
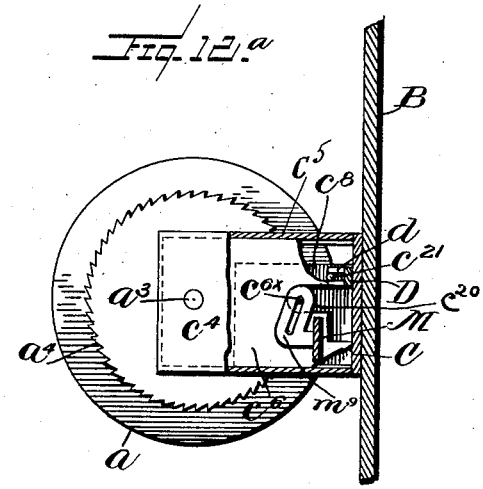
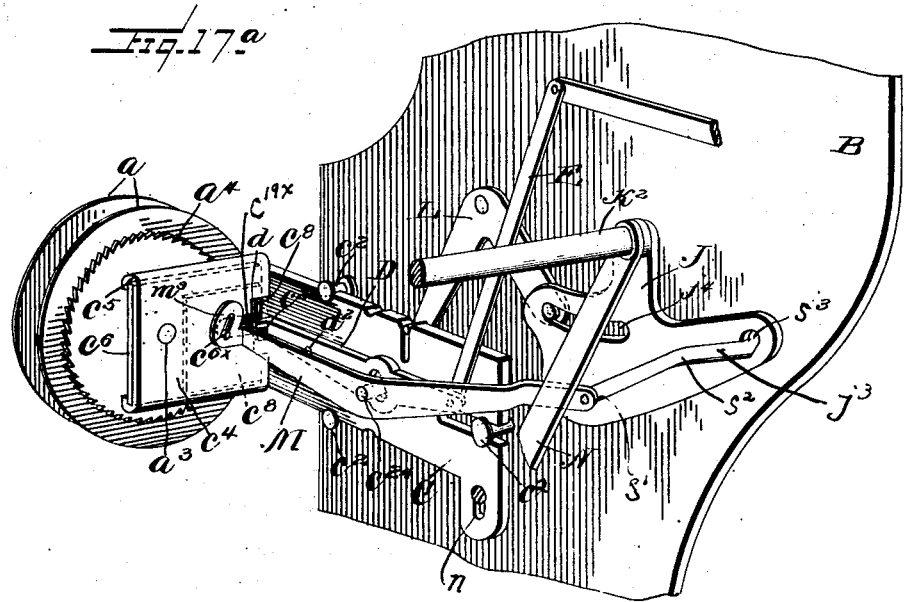
WITNESSES:
INVENTOR
George W. Donning,
by his Attorney

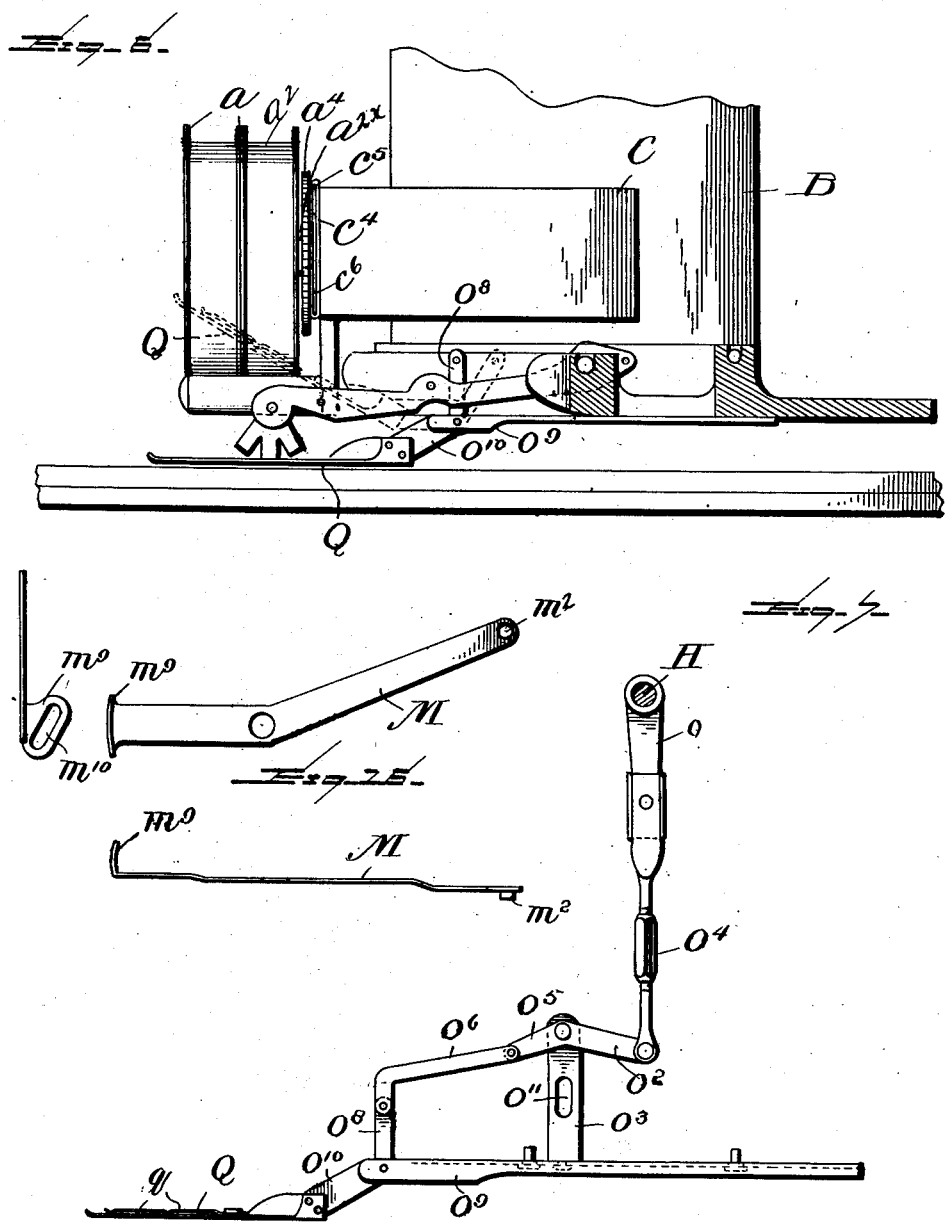

No. 840,117. PATENTED JAN. 1, 1907.
G. W. DONNING.
RECORD PRODUCING MACHINE.
APPLICATION FILED MAY 15, 1902.
10 SHEETS—SHEET 8.
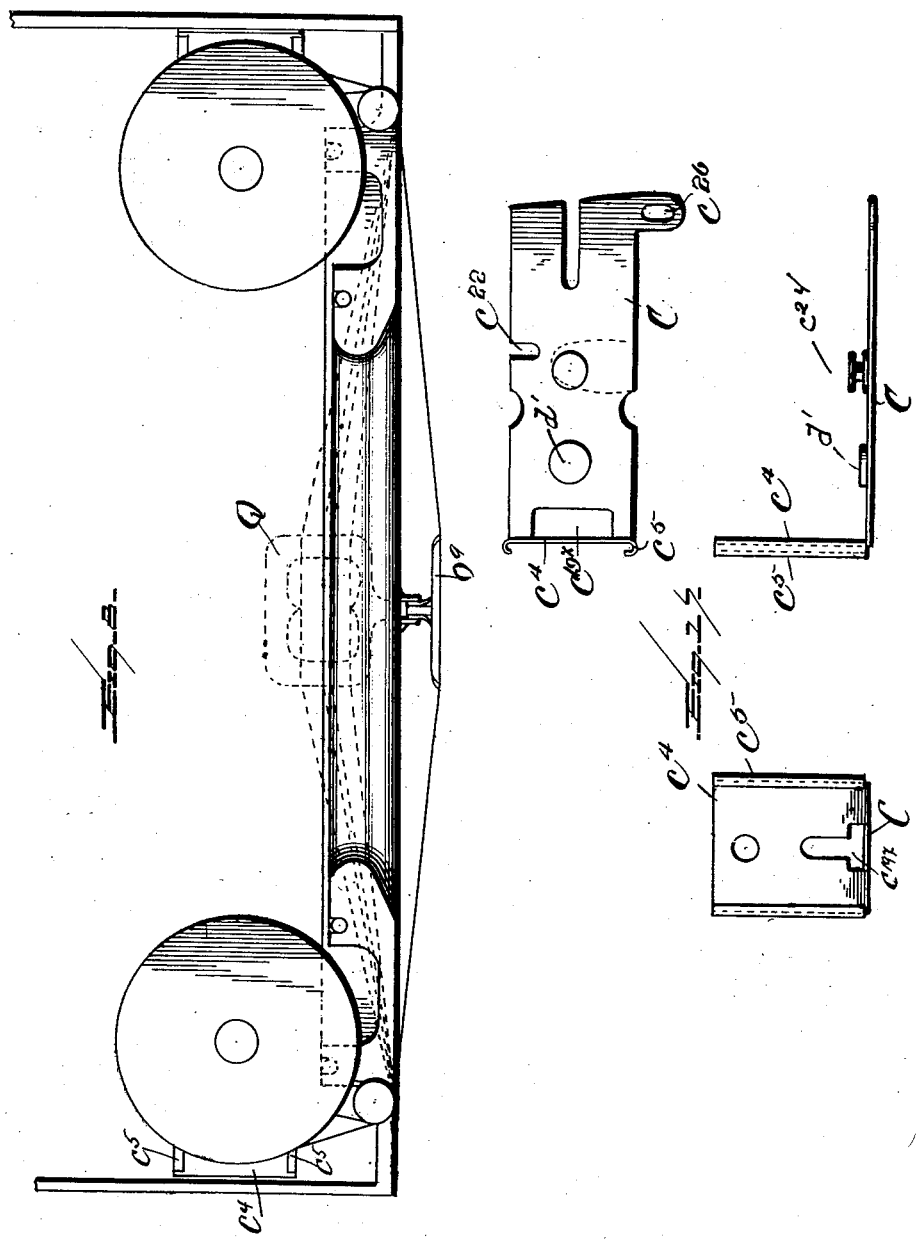
WITNESSES:
INVENTOR
George W. Donning,
by his attorney No. 840,117. PATENTED JAN. 1, 1907.
G. W. DONNING.
RECORD PRODUCING MACHINE.
APPLICATION FILED MAY 15, 1902.
10 SHEETS—SHEET 9.
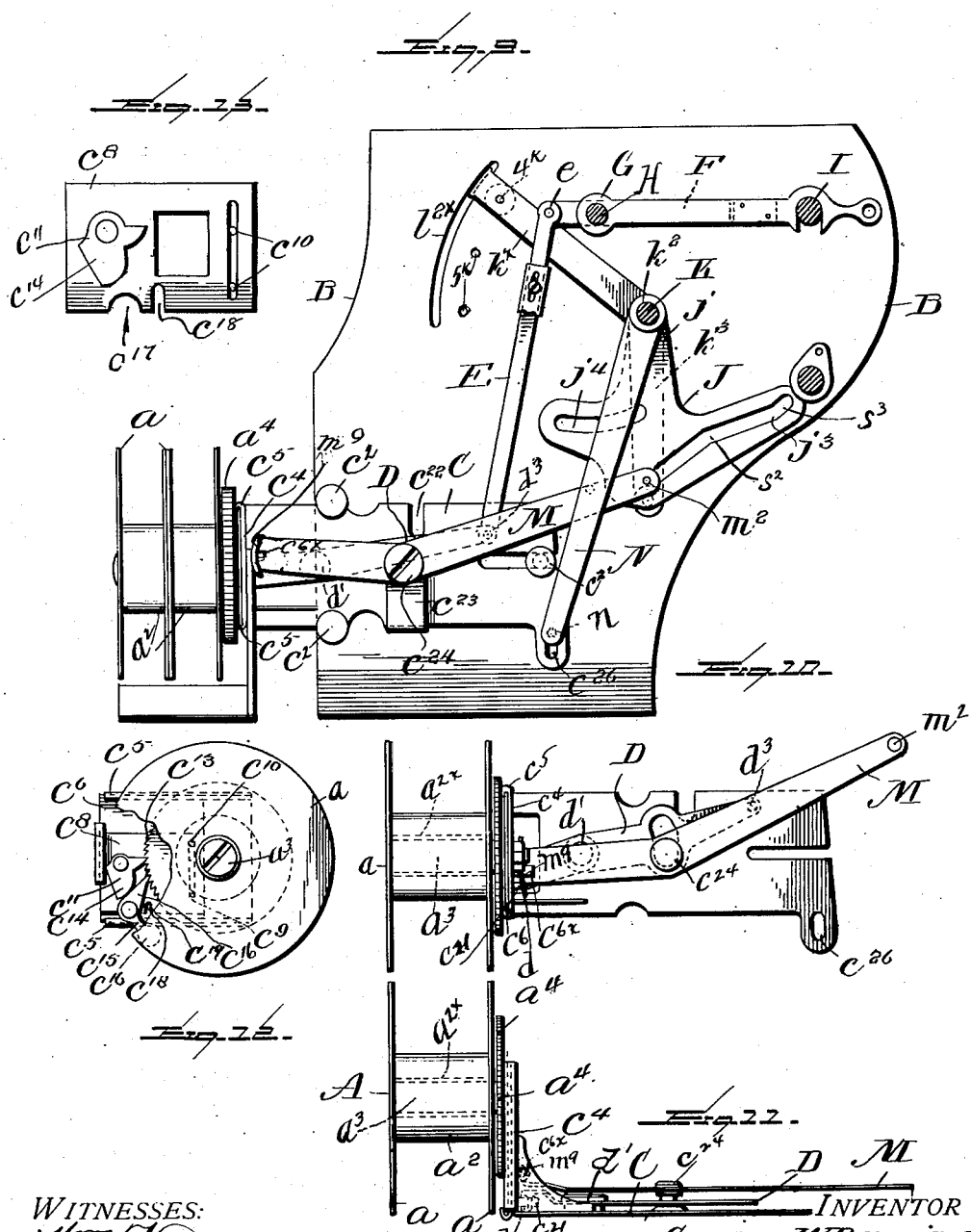
WITNESSES:
INVENTOR
George W. Donning,
by his attorney No. 840,117. PATENTED JAN. 1, 1907.
G. W. DONNING.
RECORD PRODUCING MACHINE.
APPLICATION FILED MAY 15, 1902.
10 SHEETS—SHEET 10.
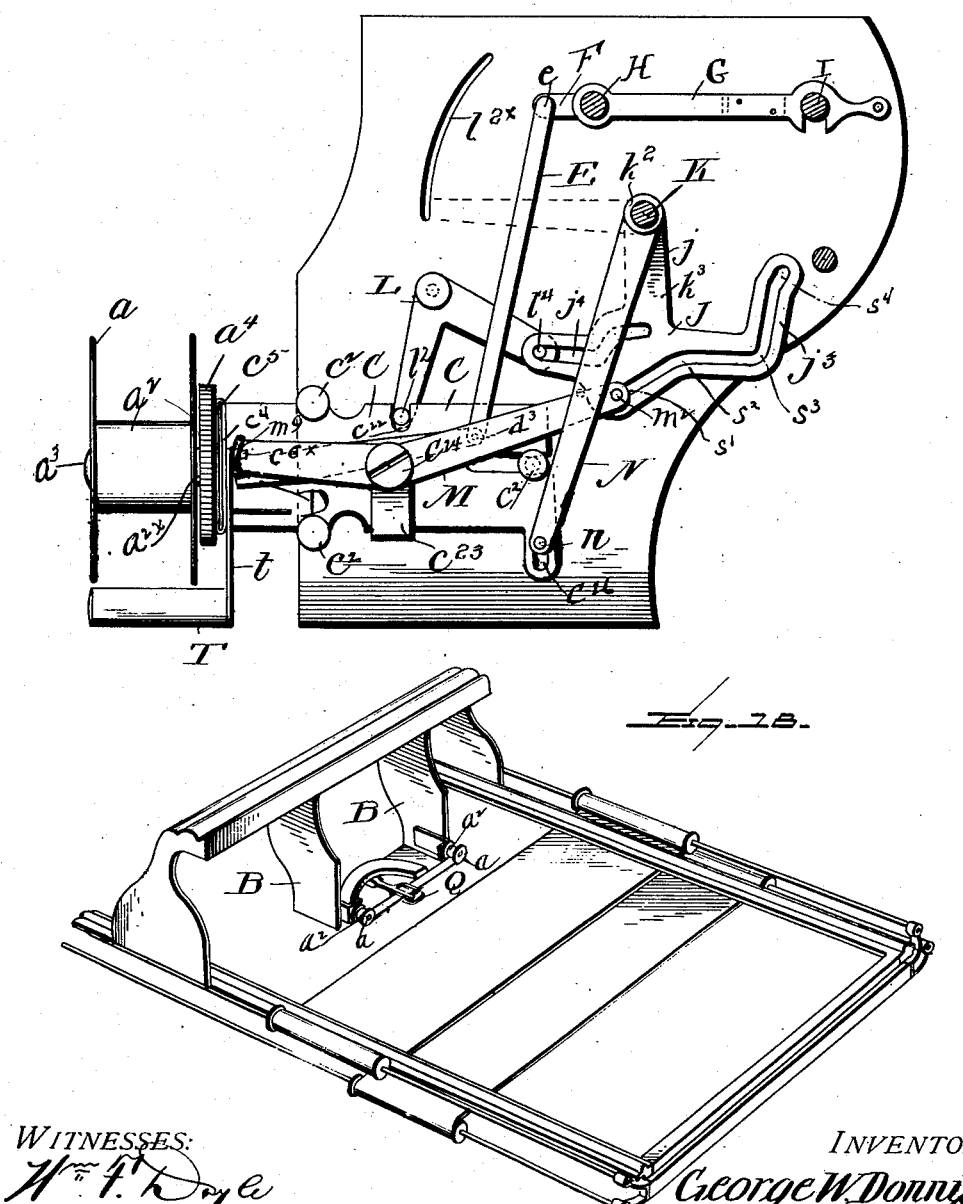
WITNESSES:
INVENTOR
George W. Donning.
by
Attorney

UNITED STATES PATENT OFFICE.

GEORGE W. DONNING, OF EAST ORANGE, NEW JERSEY, ASSIGNOR TO HARRY T. AMBROSE, OF ORANGE, NEW JERSEY.

RECORD-PRODUCING MACHINE.

No. 840,117.     Specification of Letters Patent.     Patented Jan. 1, 1907.

Application filed May 15, 1902. Serial No. 107,471.

To all whom it may concern:

Be it known that I, GEORGE W. DONNING, a citizen of the United States, residing at East Orange, in the county of Essex and State of New Jersey, have invented certain new and useful Improvements in Record-Producing Mechanisms; and I do hereby declare the following to be a full, clear, and exact description of the invention, such as will enable others skilled in the art to which it appertains to make and use the same.

My invention relates to an improved ribbon mechanism for writing-machines; and it consists in the constructions, combinations, and arrangements herein described and claimed.

The objects of my invention are to provide means by which the entire width of the ribbon may be utilized or a plurality of ribbons may be employed and conveniently shifted to bring any desired ribbon in operative position for printing.

While I have illustrated my invention applied to a flat-platen type-writer, it could obviously be employed with various types of writing-machines.

Referring to the accompanying drawings, forming a part of this application, and in which similar reference characters indicate corresponding parts in the several views, Figure 1 is a perspective view illustrating one embodiment of my invention applied to a flat-platen type-writer. Fig. 2 is a transverse sectional elevation of the parts shown in Fig. 1, the ribbon-carrier being constructed for two ribbons. Fig. 3 is a transverse sectional elevation showing the parts at the opposite end of the type-writer from that illustrated in Fig. 2 with the ribbon-guide omitted. Fig. 4 is a front elevation of one end of the type-writer. Fig. 5 is a plan view of the construction shown in Fig. 1. Fig. 5ª is a fragmentary view of ribbon-shifting and feed-reversing arm. Fig. 6 is a detail sectional elevation, on an enlarged scale, showing the ribbon-spools and ribbon-guide, with one of the type-bars in printing position. Fig. 7 is a side elevation showing the ribbon-guide and its actuating connections. Fig. 8 is a front elevation showing the ribbon-spools and ribbon-guide, the normal raised position of the latter being indicated in broken lines. Fig. 9 is a transverse sectional elevation showing my invention applied to a flat-platen type-writer in which a plurality of ribbons are employed. Fig. 10 is a detail side elevation, on an enlarged scale, showing the ribbon-spool, its supporting-bracket, the feed-actuating lever, and the reversing-lever. Fig. 11 is a bottom plan view of the parts shown in Fig. 10. Fig. 12 is a front view, partly broken away, of the construction illustrated in Figs. 10 and 11. Fig. 12ª is a view in rear elevation of parts shown in Fig. 12. Fig. 13 is a detail view, on an enlarged scale, showing the shifting plate and one of the spool-actuating pawls. Fig. 14 is a transverse sectional elevation showing a modified construction wherein one ribbon having a plurality of paths is to be employed and adapted to shift the ribbon to position the same for one of the four different paths thereon. Fig. 15 shows three detail views of the feed-lever. Fig. 16 shows three detail views of the feed-reversing lever. Fig. 17 shows three detail views of the spool-supporting plate or bracket. Fig. 17ª is a fragmentary view in perspective of the shiftable supporting-plate, showing the position and form of the parts from the rear of the ribbon feed and reverse devices; and Fig. 18 is a perspective view illustrating the general arrangement of the parts when employed to produce a plurality of copies.

The ribbon-spools and their actuating mechanisms at both sides of the machine are similar. Hence it will be necessary to describe only one of them.

Referring to the drawings, $a^2$ $a^2$ indicate ribbon-spools provided with retaining-flanges or disks $a$ and frictionally supported on tubular spindles $a^{2\times}$, carried by pins $a^3$. The tubular spindles $a^{2\times}$ can be advantageously slotted and compressed longitudinally to cause them to bear against the ribbon-spools with a sufficient pressure to engender the proper frictional contact.

*Ribbon-feed mechanism.*—As illustrated, each ribbon employed is carried on two spools, which are supported at opposite sides of the writing-point. If desired, however, a plurality of ribbons can be carried on two oppositely-supported spools, which could obviously be formed of sufficient width to accommodate the aggregate width of the several ribbons. A ratchet-wheel $a^4$ is secured on the spindle $a^{2\times}$ and constructed to be engaged by two pawls $c^{11}$ and $c^{15}$, which are provided with weighted portions $c^{14}$ and $c^{16}$, respectively, to maintain them in operative position on their supports. (See especially Figs. 12, 12ª, and 13 and 17ª.) The feed-pawl $c^{11}$ is pivotally secured to a block $c^8$, which block is mounted for vertical reciprocation on a plate $c^6$. Studs $c^{10}$, carried by the plate $c^6$, are shown extending through a slot $c^9$ in the block $c^8$ to guide and limit the movement of said block on its supporting-plate $c^6$. The block $c^8$ may also be provided with a slot $c^{18}$, constructed to engage a guiding-stud $c^{19}$ on the plate $c^6$. The block $c^8$ has a vertically-reciprocatory movement, so that the pawl $c^{11}$, which it carries, may by its engagement with the ratchet-wheel cause the same to be rotated partially to turn the spools and feed the ribbon. The plate $c^6$ has a horizontally-reciprocating movement (carrying also the block $c^8$) to move both pawls $c^{11}$ $c^{15}$ out of engagement with the ratchet-wheel by the mechanism hereinafter described. The plate $c^6$ carries the retaining-pawl $c^{15}$, which works in a vertical slot $c^{17}$, formed in the lower edge of the plate $c^8$, Fig. 13, and is slidably supported in flange-bearings $c^5$, carried by the angularly-extending portion $c^4$ of the slide C, which latter is slidably supported on the side plate B of the type-writer by guides $c^2$. A stud $c^{21}$, projecting from the back of the block $c^8$, extends through slots $c^{20}$ and $c^{19 \times}$, formed, respectively, in the plate $c^6$ and angular portion $c^4$. (See particularly Figs. 12ª and 17ª.) A lever D, pivoted at $d'$ to the slide C, is provided with a bent forward end $d$, formed with a slot $d^2$, to constitute a yoke embracing the stud $c^{21}$. The inner end of said lever D is pivotally connected at $d^3$ to a link E, which latter is pivotally connected at $e$ to a bent arm F, extending from a lever G. The lever G is rockingly supported on a rod I and carries a universal bar H at its forward end. A spring $g^2$ is shown attached to the rear end of the lever G for returning the same to its normal position after actuation.

From the above description it will be clearly understood that upon actuation of the universal bar H the lever G will be depressed and the arm F and link E will act to rock the lever D, and thus raise the block $c^8$ to cause the feed-pawl $c^{11}$ to engage the ratchet-wheel $a^4$ and rotate the spindle $a^{2 \times}$ and this in turn serving to rotate the ribbon-spool. It will be noted that the pawl $c^{11}$ is so arranged relatively to the ratchet-wheel $a^4$ that it is removed from engagement with said wheel during the latter portion of its upward movement—that is to say, the pawl $c^{11}$ is disposed at a point on the block $c^8$ that when said block is raised in the manner just described the pawl will at first engage the ratchet-wheel and rotate it, and the continuous upward travel of the block $c^8$ will carry the pawl upward also until its vertical line of movement removes it from engagement with the ratchet-wheel. During this upward travel of the pawl $c^{11}$ the pawl $c^{15}$ (which is normally held in engagement with the ratchet-wheel by its weighted end $c^{16}$) remains stationary and engages with the ratchet-wheel to prevent retrograde rotation of the same, for the reason that said pawl $c^{16}$ is pivoted on the plate $c^6$ and has no upward movement with the pawl $c^{11}$, the slot $c^{17}$ permitting the block $c^8$ to be moved without interfering with the pawl $c^{15}$. This disengagement of the pawl $c^{11}$ from the ratchet-wheel at a certain point in its upward travel permits the ribbon-spool to remain stationary temporarily at that point of the operation, so that no feeding of the ribbon occurs at that moment, which is the moment that the type-bar strikes the ribbon to print. This precludes any blurring of a letter by movement of the ribbon across the type character at the instant of printing.

*Ribbon-shift and feed-reversing mechanism.*—A cam-plate J is secured to a shaft K and provided with cam-surfaces $j^3$ and $j^4$. A bell-crank lever L, pivoted to the type-writer frame, carries at one end a stud $l^2$, engaging a slot $c^{22}$ in the slide C, and at its other end a stud $l^4$, engaging a cam-surface $j^4$. A lever M is pivoted at $c^{24}$ on a projecting portion $c^{23}$ of the slide C. The rear end of the lever M carries a stud $m^2$, arranged in engagement with the cam-surface $j^3$, and the forward end of said lever is formed with an offset $m^9$, provided with an obliquely-disposed slot $m^{10}$. The obliquely-disposed slot $m^{10}$ embraces a stud $c^{6 \times}$, carried by the plate $c^6$, whereby said plate will be reciprocated in its bearings $c^5$ upon swing of the lever M and carry the pawl $c^{11}$ out of engagement with the ratchet-wheel $a^4$.

It will be understood that the feed-pawls at one side of the machine are to be thrown in operative position when those at the other side are shifted out of engagement with the ratchet-wheel $a^4$, and for this purpose the oblique slots $m^{10}$ of the levers M, arranged at opposite sides of the machine, are so disposed that when the pawls at one side of the machine are thrown out of operative position those at the other side are thrown into engagement with their ratchet-wheel $a^4$.

A tube $k^2$ is rotatably fitted on the shaft K and is shown extending throughout the length of said shaft between the attaching-points of the cam-plates J thereon. An arm $k$ (see especially Figs. 4 and 5) is secured to the shaft K and carries a detent-pin $2^k$, constructed to engage holes $3^k$ $3^k$, formed in the side plate B, to hold said arm in its several adjusted positions. It will be clear that upon operating the arm $k$ the shaft K will be turned to swing the cam-plates J, secured at each end thereof. During such swing of the cam-plates the cam-surfaces $j^3$ and $i^4$ will actuate the lever M and adjunctive parts on one side of the machine to position the pawls in engagement with the ratchet for feeding operation and on the opposite side to actuate the lever M and adjunctive parts to position the pawls out of engagement with the ratchet-wheel, whereby the feeding of the ribbon is reversed. The swinging of the cam-plates J also swings the bell-crank levers L on each side of the machine and moves the slide C, thereby shifting the spools axially to shift the spools widthwise to present a different writing-path.

The feed-reversing cam-surface $j^3$ and the ribbon-shift cam-surface $j^4$, as shown in Figs. 2 and 3, are preferably so constructed that when the parts are adjusted to feed the ribbon in one direction the type will strike along one of two outside paths extending adjacent to the two edges of the ribbon, and upon adjustment of the parts to feed the ribbon in the opposite direction the type will strike along a path lying in the middle of the ribbon.

Fig. 14 illustrates a modification in which the cam-surface $j^4$ is arranged with four points of rest, whereby the ribbon may be positioned to present one of a plurality of writing-paths—that is to say, the cam-plate J may be swung to position the stud $l^4$ at one point of rest in said cam-surface $j^4$, and this will have actuated the bell-crank lever L to move the slide C and shift the ribbon-spool and ribbon to one point. The further swinging of the cam-plate will give the slide still another position to shift the spool and ribbon, and so on until the ribbon shall have been positioned for any of its four writing-paths. At the same time the feed-reversing cam-surface $j^3$ is arranged so that when the cam-plate is being swung to shift the ribbon said cam-surface will operate the lever M and reverse the ribbon-feed.

From the foregoing discussion of the forms of the invention represented by Figs. 1 and 14 it will be seen that the cam way or surface $j^3$ comprises a plurality of stations for governing successive feed reversals. In Figs. 1, 2, and 3 and 9 there are three of these stations, (designated $s'$, $s^2$, and $s^3$,) while in Fig. 14 there are four, (lettered, respectively, $s'$, $s^2$, $s^3$, and $s^4$.) These stations govern the feed reversal, since when the pin $m^2$ of lever M engages the stations $s'$ or $s^3$ the forward end $m^9$ of the lever is at its limit of elevation, and owing to the direction of inclination of the slot $m^{10}$ the pawls $c^{11}$ $c^{15}$ at the side of the machine illustrated are shifted into operative relation with the ratchet-wheel, while when the pin occupies stations $s^2$ or $s^4$ portion $m^9$ of the lever is at its limit of depression, and the pawls are removed from operative position. Further, the parts so coöperate that the feed-reversing lever engages with a plurality of these stations while the spool-shifting lever L, actuated by camway $j^4$, is shifting the spool axially in one direction. It will be readily recognized that lever $k$, secured to shaft K, is an embodiment of common means for shifting the ribbon-carrier axially and at the same time causing the feed-reversing lever to engage with the reversal-governing stations in the cam-surface $j^3$ and that detent-pin $2^k$ and holes $3^k$ represent one form of locking means for securing the parts at the several points of feed reversal. From another point of view this feature of my invention may be regarded as comprising an axially-shiftable ribbon-carrier, means for locking said carrier against shifting at any one of a number of predetermined points, a cam-surface provided with a plurality of stations governing successive feed reversals, a feed-reversing member engaging said cam-surface, and common operating means for shifting the ribbon-carrier and causing the feed-reversing member to engage such stations successively as the ribbon-carrier assumes its various predetermined positions.

It is to be noted that the association of levers L and M with the cam-slots in the plate J is such that the carrier-supporting plate C is securely retained in its several shifted positions, and the pawls are maintained either in or out of engagement with the ratchet-wheel by the peculiar engagement of the operating parts. In other words, the ribbon-shifting mechanism is self-retaining and self-releasing at the several positions to which the ribbon is shiftable transversely. In addition, however, I may employ the locking-pin $2^k$, already referred to, as being mounted on operating-lever $k$.

Fig. 9 illustrates a construction in which two sets of spools are employed for carrying separate ribbons. In this modification an arm $k^3$, located outside of the side plate B, (shown in dotted lines, Fig. 9, to the rear of the cam-plate J,) is secured to the shaft K. In this construction the cam-surface $j^4$ has no function, but is preferably formed on the cam-plate J in order that the machine may be conveniently converted into a single-ribbon machine, if desired. It will be clear that movement of the arm $k^3$ will thus operate through the cam-surface $j^3$ to reverse the ribbon-feed. An arm $k^\times$, secured to the tube $k^2$, is shown located inside the side plate B and carrying a detent-pin $4^k$, arranged to engage openings $5^k$ $5^k$ in the side plate for securing the arm in its several adjusted positions. The arm $k^\times$ is shown extending through a slot $l^{2\times}$ in the side plate B and provided with a handle beyond said plate for convenience of operation. An arm N, secured to the tube $k^2$, carries a stud $n$ at its lower end in engagement with a slot $c^{26}$ in the slide C. The arm is rigidly secured to the tube $k^2$, and when the slide C is shifted said tube will be rotated, (the plate $c^{26}$ in the slide C being elongated to give the necessary play of movement.)

*Ribbon-guide.*—Figs. 1, 2, 4, 5, 7, 8, and 18 show a ribbon-guide Q, constructed to support that portion of the ribbon adjacent to the printing-point and to elevate the ribbon upon release of the key-lever after printing any character in order that a "visible" system of type-writing may be provided. The ribbon-guide Q is provided with an opening sufficiently large to embrace the printing-space of the machine and carries guide-strips $q$, which are constructed to retain and guide the ribbon against its guide Q. These retaining-strips $q$ preferably constitute flat pieces of spring metal and may be ribbed on their bearing-surfaces to present a guiding-recess for each ribbon employed. A plate $o^9$ is shown slidably supported in the type-writer frame for a back-and-forth movement in a direction perpendicular to the path of the ribbon. The ribbon-guide Q is carried by an arm $o^{10}$ of a bell-crank lever $o^8$ $o^{10}$, the other arm $o^8$ of said lever being connected by a link $o^6$ to the arm $o^5$ of a lever $o^2$ $o^5$. The lever $o^2$ $o^5$ is fulcrumed on a post $o^3$, carried by the sliding plate $o^9$. A connecting member $o$ is pivotally connected to the arm of the lever $o^2$ $o^5$ and is pivoted at its upper end on the universal bar H. The connecting member $o$ is preferably provided with an adjusting device, such as a turnbuckle $o^4$.

Figs. 1, 2, and 4 show the ribbon-guide Q in its normal position, in which the ribbon is elevated to render the writing visible. Upon depression of any key-lever the universal bar H will be depressed to shift the guide Q into its lower operative position, in which it is ready to receive the printing impact of the type, as shown in Figs. 5, 6, and 7, and upon return of the universal bar H to its normal upper position after release of the key-lever the ribbon-guide Q will be raised to its normal position. An arm R, Figs. 1 and 4, secured to the tube $k^2$, carries at its lower end a stud engaging a slot $o^{11}$ in the post $o^3$, Fig. 7. It will be clear that by this construction the tube $k^2$ will be turned by the arm N when the ribbon-spools are axially shifted and that the arm R, secured to the tube $k^2$, will shift the slide-plate $o^9$ to maintain the ribbon-guide Q in proper position relatively to the ribbon-spools.

As previously set forth, the ribbon-guide serves to position and hold the ribbon removed from the printing area. In its movement of descent it carries the ribbon downward to the printing-point. During these movements of positioning the ribbon the ribbon is held taut by the tension devices on the spools to prevent blurring of the writing. To assist the positioning of the ribbon, guide-rollers T, supported on brackets $t$, are arranged beneath the ribbon-spools.

As shown in Figs. 1, 2, and 3, the form of my invention which provides for a three-path feed is applicable either to a double or a single spool-carrier, only with a double-spool carrier the middle path is not used, since it would fall between the two ribbons. It will be obvious, likewise, that the form of my invention illustrated in Fig. 14, where a four-path feed is shown provided for, is applicable to both single and double spool carriers, there being two paths for each ribbon or for each longitudinal half of a compound ribbon.

Having thus fully described my invention, what I claim as new, and desire to secure by Letters Patent, is—

1. In a writing-machine, the combination of a rotatable ribbon-carrier, a ratchet-wheel connected therewith, a shiftable plate, and a feed-pawl mounted reciprocably thereon to rotate said wheel and shiftable therewith into and out of operative relation to said wheel.

2. In a writing-machine the combination of a rotatable ribbon-carrier, a ratchet-wheel connected therewith, a shiftable member, a feed-pawl movable thereon to rotate the ratchet-wheel and shiftable therewith into and out of operative relation to said wheel, and a retaining-pawl shiftable into and out of operative relation with said wheel by said member.

3. In a writing-machine, the combination with a traveling writing mechanism, of a ribbon-carrier disposed contiguous to and movable with said writing mechanism, a slidable member upon which said ribbon-carrier is rotatably mounted, a ratchet-wheel connecting with said carrier to rotate the same, means for shifting said slidable member, and means for rotating said ratchet-wheel, and means for effecting disengagement of said ratchet-wheel-rotating means.

4. In a writing-machine, the combination with a ribbon-carrier, a horizontally-slidable member upon which said carrier is rotatably supported, means for shifting said member, a ratchet-wheel, a plurality of pawl-carrying members arranged to be reciprocated together in one direction to position the same relative to the ratchet-wheel, and one of said members being constructed to be reciprocated in a direction different from that of the plurality of members together.

5. In a writing-machine, the combination with a ribbon-carrier, a ratchet-wheel disposed contiguous thereto, a slidable member upon which said carrier is supported, means for shifting said slidable member, pawl-carrying members movably supported on said slidable member, and means distinct from each other for moving each of said pawl-carrying members.

6. In a writing-machine, the combination with a ribbon-carrier, a toothed wheel disposed contiguous thereto, a slidable member upon which said carrier is rotatably supported, pawl-carrying members arranged on and shiftable with said slidable member, means constructed to reciprocate said members in one direction, and independent means constructed to actuate one of said members in a different direction.

7. In a writing-machine, a rotatable ribbon-carrier, a carrier-rotating device disposed contiguous thereto, a plurality of sliding members arranged to be moved together in one direction, one of said members being constructed to be moved in a different direction, a support member slidable axially of the ribbon-carrier and upon which said slidable members are movably supported, means for shifting said support member, and means for actuating said sliding members independent of the movement of said support member.

8. In a writing-machine, the combination with printing mechanism, and with an operating member coöperating therewith, of ribbon-feed mechanism comprising a shiftable member, a retaining-pawl member arranged to be oscillated on said shiftable member, a feed-pawl member constructed to be reciprocated on said shiftable member, means for shifting said shiftable member and said retaining-pawl member into and out of operative position, and means connecting with said operating member for reciprocating said feed-pawl member.

9. In a writing-machine, the combination with printing mechanism, of an operating member constructed and arranged to be actuated by said printing mechanism, of a shiftable member, means for shifting said shiftable member, a ratchet-wheel, and a pawl member shiftable with said shiftable member into and out of operative relation to said wheel and constructed to be actuated by the operation of said operating member.

10. In a writing-machine, the combination with a ratchet-wheel, a shiftable support member upon which said wheel is supported, pawl-carrying plates movably supported on said support member, means for actuating one of said pawl-carrying plates vertically to rotate the ratchet-wheel, means for reciprocating the other of said pawl-carrying plates in a direction at an angle to the actuation of said first-named pawl-carrying plate to engage the same with the ratchet-wheel, and means for shifting the support member.

11. Ribbon-feeding, reversing and shifting mechanism, comprising a ribbon-spool, a ratchet-wheel, a shiftable support member connecting with said ribbon-spool and ratchet-wheel, a swinging two-member lever, one member of which engages said shiftable support member, a cam-plate engaged by the other member of said lever, means for swinging said cam-plate, and means for rotating said ratchet-wheel and spool.

12. In ribbon mechanism, the combination with a ribbon-spool and a ratchet-wheel, of a shiftable support member with which said spool and ratchet-wheel connect, a bell-crank lever, one member of which engages said shiftable support member, a swinging cam-plate engaged by another member of said bell-crank lever, means for swinging said cam-plate to move the bell-crank lever and shift said support member, a feed-reversing arm also engaging, and operated by, said cam-plate, and means for rotating said ratchet-wheel and spool.

13. In ribbon mechanism, the combination with a ribbon-spool and a ratchet-wheel, of a shiftable support member with which said spool and ratchet-wheel connect, a bell-crank lever, one member of which engages said shiftable member, a swinging cam-plate engaged by another member of said bell-crank lever, means for swinging said cam-plate to move the bell-crank lever and shift said shiftable member, a feed-reversing arm also engaging, and operated by, said cam-plate, and a feed-lever fulcrumed on said support member and constructed to effect rotation of the ratchet-wheel and spool.

14. In ribbon mechanism for type-writers, the combination with a ribbon-spool and a ratchet-wheel, of a shiftable support member, a two-member bell-crank lever, one member of which engages said support member, a cam-plate with which the other member of said bell-crank lever engages, a feed-reversing arm also engaging said cam-plate, a feed-lever fulcrumed on and movable with said support member, and a reciprocating pawl-carrying plate with which said feed-lever engages and constructed to rotate the ratchet-wheel and spool.

15. In ribbon mechanism for type-writers, the combination with a ribbon-spool and a ratchet-wheel, of a shiftable support member, a two-member bell-crank lever, one member of which engages said support member, a cam-plate with which the other member of said bell-crank lever engages, a feed-reversing arm also engaging said cam-plate, a feed-lever fulcrumed on and movable with said support member, a reciprocating pawl-carrying plate with which said feed-lever engages and constructed to rotate the ratchet-wheel and spool, and a reciprocating plate with which said feed-reversing arm engages and constructed to shift said pawl-carrying plate in a plane at an angle to the direction of reciprocation of the pawl-carrying plate.

16. In ribbon mechanism for type-writers, the combination with a ribbon-spool and a ratchet-wheel, of a shiftable support member, a two-member bell-crank lever, one member of which engages said support member, a cam-plate with which the other member of said bell-crank lever engages, a feed-reversing arm also engaging said cam-plate, a feed-lever fulcrumed on and movable with said support member, a reciprocating pawl-carrying plate with which said feed-lever engages and constructed to rotate the ratchet-wheel and spool, and a reciprocating plate carrying a retaining-pawl with which said feed-reversing arm engages and constructed to shift said pawl-carrying plate in a plane at an angle to the direction of reciprocation of the pawl-carrying plate.

17. In ribbon mechanism for type-writers, the combination with a ribbon-spool and a ratchet-wheel, of a shiftable support member, a two-member bell-crank lever, one member of which engages said support member, a cam-plate with which the other member of said bell-crank lever engages, a feed-reversing arm also engaging said cam-plate, a feed-lever, said feed-reversing arm and feed-lever being pivotally supported on and movable with said support member, and a reciprocating pawl-carrying plate with which said feed-lever engages and constructed to rotate the ratchet-wheel and spool.

18. In ribbon mechanism for type-writers, the combination with a ribbon-spool and a ratchet-wheel, of a slide, a bell-crank lever, one member of which engages said slide, a cam-plate with which said bell-crank lever also engages, an angulated portion projecting from said slide, flanges formed on said angulated portion, a reciprocating block arranged to slide on said flanges, a reciprocating plate juxtapositioned to, and movable in one direction with, said reciprocating block, a feed-lever connecting with said reciprocating plate and constructed to actuate the same and rotate the ratchet-wheel and spool to feed the ribbon, and a feed-reversing lever connecting with said reciprocating block and constructed to actuate it to position said reciprocating plate toward and away from the ratchet-wheel.

19. In ribbon mechanism for type-writers, the combination with a ribbon-spool and a ratchet-wheel, of a slide, a bell-crank lever, one member of which engages said slide, a cam-plate with which said bell-crank lever also engages, an angulated portion projecting from said slide, flanges formed on said angulated portion, a reciprocating block arranged to slide on said flanges, a reciprocating plate juxtapositioned to, and movable in one direction with, said reciprocating block, a feed-lever, connections between said feed-lever and said reciprocating plate, and a feed-reversing lever connecting with said reciprocating block and constructed to actuate it to position said reciprocating plate toward and away from the ratchet-wheel.

20. In ribbon mechanism for type-writers, the combination with a ribbon-spool and a ratchet-wheel, of a slide, a bell-crank lever, one member of which engages said slide, a cam-plate with which said bell-crank lever also engages, an angulated portion projecting from said slide, flanges formed on said angulated portion, a reciprocating block arranged to slide on said flanges, a reciprocating plate juxtapositioned to, and movable in one direction with, said reciprocating block, a feed-lever connecting with said reciprocating plate and constructed to actuate the same and rotate the ratchet-wheel and spool to feed the ribbon, a feed-reversing lever, and connections between said lever and said reciprocating block whereby, when said lever is actuated, said block is positioned toward and away from the ratchet-wheel.

21. In ribbon mechanism for type-writers, the combination with a ribbon-spool and a ratchet-wheel, of a slide, a cam-plate operatively connected with said slide, an angulated portion projecting from said slide, flanges formed on said angulated portion, a reciprocating block movably supported in said flanges, a retaining-pawl pivoted on said block, a reciprocating plate juxtapositioned to and movable with said reciprocating block, a feed-pawl pivoted on said plate, a feed-lever connecting with said plate and constructed to actuate the same to raise said feed-pawl and effect rotation of the ratchet-wheel, a feed-reversing lever connecting with said reciprocating block and constructed to move the same and the feed-pawl-carrying plate toward and away from the ratchet-wheel and effect engagement of the pawls with and disengagement thereof from said ratchet-wheel.

22. In ribbon mechanism for type-writers, the combination with a ribbon-spool and a ratchet-wheel, of a slide, a cam-plate operatively connected with said slide, an angulated portion projecting from said slide, flanges formed on said angulated portion, a reciprocating block movably supported in said flanges, a retaining-pawl pivoted on said block, a reciprocating plate juxtapositioned to and movable with said reciprocating block, a feed-pawl pivoted on said plate, a feed-lever connecting with said plate and constructed to actuate the same to raise said feed-pawl and effect rotation of the ratchet-wheel, means for actuating said feed-lever, a feed-reversing lever connecting with said reciprocating block and constructed to move the same and the feed-pawl-carrying plate toward and away from the ratchet-wheel and effect engagement of the pawls with and disengagement thereof from said ratchet-wheel.

23. In ribbon mechanism for type-writers, the combination with a ribbon-spool and a ratchet-wheel, of a slide, a cam-plate operatively connected with said slide, an angulated portion projecting from said slide, flanges formed on said angulated portion, a reciprocating block movably supported in said flanges, a retaining-pawl pivoted on said block, a reciprocating plate juxtapositioned to and movable with said reciprocating block, a feed-pawl pivoted on said plate, a feed-lever connecting with said plate and constructed to actuate the same to raise said feed-pawl and effect rotation of the ratchet-wheel, a feed-reversing lever connecting with said reciprocating block and constructed to move the same and the feed-pawl-carrying plate toward and away from the ratchet-wheel and effect engagement of the pawls with and disengagement thereof from said ratchet-wheel, and means for operating said feed-reversing lever.

24. In ribbon mechanism for type-writers, the combination with a ribbon-spool and a ratchet-wheel, of a slide, a cam-plate operatively connected with said slide, an angulated portion projecting from said slide, flanges formed on said angulated portion, a reciprocating block movably supported in said flanges, a retaining-pawl pivoted on said block, a reciprocating plate juxtapositioned to and movable with said reciprocating block, a feed-pawl pivoted on said plate, a feed-lever connecting with said plate and constructed to actuate the same to raise said feed-pawl and effect rotation of the ratchet-wheel, a feed-reversing lever connecting with said reciprocating block and constructed to move the same and the feed-pawl-carrying plate toward and away from the ratchet-wheel and effect engagement of the pawls with and disengagement thereof from said ratchet-wheel, and means for operating said feed-reversing lever.

25. In ribbon mechanism for type-writers, the combination with ribbon-spools for feeding and receiving a ribbon, of means for effecting the feeding of said ribbon and comprising a ratchet-wheel juxtapositioned to a ribbon-spool, a feed-pawl, a reciprocating plate upon which said pawl is supported, a feed-lever connecting with said plate, a ribbon-feed-reverse device connecting with said plate and constructed to position it and its feed-pawl away from said ratchet-wheel, and means for actuating said reverse device.

26. In ribbon mechanism for type-writers, the combination with ribbon-spools for feeding and receiving a ribbon, of means for effecting the feeding of said ribbon and comprising a ratchet-wheel juxtapositioned to a ribbon-spool, a feed-pawl, a reciprocating plate upon which said pawl is supported, a feed-lever connecting with said plate, a ribbon-feed-reverse device connecting with said plate and constructed to position it and its feed-pawl away from said ratchet-wheel, means for actuating said reverse device, and means for shifting the ribbon widthwise.

27. In ribbon mechanism for type-writers, the combination with ribbon-spools for feeding and receiving a ribbon, of means for effecting the feeding of said ribbon and comprising a ratchet-wheel juxtapositioned to a ribbon-spool, a feed-pawl, a reciprocating plate upon which said pawl is supported, a feed-lever connecting with said plate and constructed to actuate it and its feed-pawl to rotate said ratchet-wheel, means for actuating said feed-lever, and a ribbon-guide device constructed to be oscillated simultaneously with the feed of the ribbon.

28. In ribbon mechanism for type-writers, the combination with ribbon-spools for feeding and receiving a ribbon, of means for effecting the feeding of said ribbon and comprising a ratchet-wheel juxtapositioned to a ribbon-spool, a feed-pawl, a reciprocating plate upon which said pawl is supported, a feed-lever connecting with said plate, a ribbon-feed-reverse device connecting with said plate and constructed to position it and its feed-pawl away from said ratchet-wheel, means for actuating said reverse device, means for shifting said ribbon-spools axially, a ribbon-guide, and means for shifting the ribbon-guide.

29. In ribbon mechanism for type-writers, the combination with a ribbon-spool and a ratchet-wheel connecting therewith, of a supporting member, a cam-plate disposed in juxtaposition thereto, a feed-lever constructed and arranged to effect rotation of the ratchet-wheel and ribbon-spool, a feed-reversing lever arranged to engage said cam-plate, means for actuating said cam-plate, and means for operating said feed-lever.

30. In ribbon mechanism for type-writers, a ribbon-spool and a ratchet-wheel connecting therewith, a supporting member upon which said spool and ratchet-wheel are disposed, a plurality of movable plates arranged on said supporting member, a feed-lever connecting with one of said plates and constructed to effect rotation of the ratchet-wheel and spool to feed the ribbon, and a feed-reversing lever connecting with another of said movable plates and constructed to shift the same and reverse the feed of the ribbon.

31. In ribbon mechanism for type-writers, a ribbon-spool and a ratchet-wheel connecting therewith, a supporting member upon which said spool and ratchet-wheel are disposed, a plurality of movable plates arranged on said supporting member, a feed-lever connecting with one of said plates and constructed to effect rotation of the ratchet-wheel and spool to feed the ribbon, a feed-reversing lever connecting with another of said movable plates and constructed to shift the same and reverse the feed of the ribbon, and a cam-plate with which said feed-reversing lever engages and constructed to actuate the same.

32. In ribbon mechanism for type-writers, a ribbon-spool and a ratchet-wheel connecting therewith, a supporting member upon which said spool and ratchet-wheel are disposed, a plurality of movable plates arranged on said supporting member, a feed-lever connecting with one of said plates and constructed to effect rotation of the ratchet-wheel and spool to feed the ribbon, a feed-reversing lever connecting with another of said movable plates and constructed to shift the same and reverse the feed of the ribbon, a cam-plate with which said feed-reversing lever engages and constructed to actuate the same, and means for swinging said cam-plate.

33. In ribbon mechanism for type-writers, a ribbon-spool and a ratchet-wheel connecting therewith, a supporting member upon which said spool and ratchet-wheel are disposed, a plurality of movable plates arranged on said supporting member, a feed-lever connecting with one of said plates and constructed to effect rotation of the ratchet-wheel and spool to feed the ribbon, a feed-reversing lever connecting with another of said movable plates and constructed to shift the same and reverse the feed of the ribbon, a cam-plate with which said feed-reversing lever engages and constructed to actuate the same, a shaft upon which said cam-plate is supported, and an arm for moving said shaft to swing said cam-plate.

34. In ribbon mechanism for type-writers, a ribbon-spool and a ratchet-wheel connecting therewith, a supporting member upon which said spool and ratchet-wheel are disposed, a plurality of movable plates arranged on said supporting member, a feed-lever connecting with one of said plates and constructed to effect rotation of the ratchet-wheel and spool to feed the ribbon, a feed-reversing lever connecting with another of said movable plates and constructed to shift the same and reverse the feed of the ribbon, a cam-plate with which said feed-reversing lever engages and constructed to actuate the same, a shaft upon which said cam-plate is supported, an arm for moving said shaft to swing said cam-plate, a tube encircling said shaft, an arm on said tube connecting with the supporting member, a second arm on the tube, and a slidable ribbon-guide connected with said arm.

35. In ribbon mechanism for type-writers, a ribbon-spool and a ratchet-wheel connecting therewith, a shiftable supporting member upon which said spool and ratchet-wheel are disposed, a ribbon-feeding device supported on said supporting member, a feed-reversing device also supported thereon, and a single means for shifting said supporting member and actuating the feed-reversing device.

36. In a writing-machine, the combination with a traveling writing mechanism, a spool-supporting member disposed thereon, a ribbon-carrier mounted on the supporting member, means for effecting rotation of the ribbon-carrier to feed the ribbon, an operating-bar constructed to effect operation of the ribbon-carrier-rotating means, a cam member connecting with said spool-supporting member, and means for operating said cam member and constructed to effect widthwise shifting of the ribbon carried by the spool.

37. In a writing-machine, the combination with a traveling writing mechanism, a spool-supporting member disposed thereon, a ribbon-carrier mounted on the supporting member, means for effecting rotation of the ribbon-carrier to feed the ribbon, an operating-bar constructed to effect operation of the ribbon-carrier-rotating means, a cam member connecting with said spool-supporting member, and means for operating said cam member and constructed to effect widthwise shifting of the ribbon carried by the spool and, simultaneously, effect reversal of the feed of the ribbon.

38. In a writing-machine, the combination with a traveling writing mechanism, a slidable spool-supporting member disposed thereon, a ribbon-carrier mounted on the supporting member, means for effecting rotation of the ribbon-carrier to feed the ribbon, an operating-bar constructed to effect operation of the ribbon-carrier-rotating means, a cam member disposed contiguous to and connecting with said spool-supporting member, a rotatable shaft upon which said cam member is supported, and means for rotating said shaft whereby said slidable member is actuated to shift the ribbon widthwise.

39. In a writing-machine, a slidable spool-supporting member, a ribbon-carrier disposed on said slidable member, means for effecting rotation of said ribbon-carrier in one direction to feed the ribbon, a cam member disposed contiguous to and connecting with said slidable member, a rotatable shaft upon which said cam member is supported and constructed to swing the same, means supported on said slidable member and engaging said cam member whereby, when said cam member is actuated, reversal of the feed of the ribbon will be effected.

40. In a writing-machine, the combination with a slidable supporting member, a ribbon-carrier disposed thereon, means for effecting rotation of the ribbon-carrier to feed the ribbon, a cam member disposed adjacent to said slidable member, a connecting device engaging the cam member and the slidable member, a rocking member supported on said slidable member and engaging the cam member, a rotatable shaft upon which the cam member is supported and constructed to effect movement of the cam member to actuate the slidable member to shift the ribbon widthwise and, simultaneously, to operate the rocking member and effect reversal of the feed of the ribbon.

41. In a writing-machine, the combination with a traveling writing mechanism, of a slidable member, a ribbon-carrier connecting therewith and movable with said writing mechanism, means for effecting rotation of the ribbon-carrier, an operating-bar actuated by the writing mechanism, means connecting with the operating-bar and said carrier-rotating means to effect operation thereof to feed the ribbon lengthwise, a carrier-supporting member, means engaging said carrier-supporting member and constructed to actuate the same to effect shifting of the ribbon widthwise, and means for simultaneously effecting reversal of the feed of the ribbon.

42. In a writing-machine, the combination with a ribbon-carrier-supporting member, a ribbon-carrier disposed thereon and movable with the writing mechanism, an operating member actuated by the writing mechanism, a ribbon-feeding device actuated by the operating member to feed the ribbon lengthwise, a swinging member connecting with said carrier-supporting member and constructed to actuate the same to shift the ribbon to one of a plurality of positions widthwise of its feeding path, and means for holding the same in such shifted position.

43. In a writing-machine, the combination with writing mechanism, a ribbon-carrier arranged at each side of the writing mechanism and movable therewith, an operating-bar actuated by the writing mechanism, a ribbon-feeding device actuated by the operating-bar, a slidable carrier-supporting member, a swinging member connecting with said slidable supporting member and constructed to actuate the same to shift the ribbon widthwise, means for supporting and actuating said swinging member, a ribbon-guide disposed intermediate of said ribbon-carriers, means connecting said guide and swinging-member-supporting device and constructed to shift said ribbon-guide simultaneously with the shifting of said slidable supporting member, and means connecting said ribbon-guide and operating-bar and constructed to oscillate said guide simultaneously with the feeding of the ribbon.

44. In a type-writer, the combination with a writing mechanism, of ribbon-carriers disposed at either side thereof, a slidable supporting member upon which each of said ribbon-carriers is disposed, a universal operating-bar actuated by said writing mechanism, a ribbon-feed device connecting with said ribbon-carriers and actuated by said operating-bar to feed the ribbon lengthwise over the printing-point, means for shifting the ribbon widthwise, a vertically-vibrating ribbon-guide disposed contiguous to the printing-point, means for vibrating said guide, and means for shifting the ribbon-guide horizontally.

45. In a type-writer, the combination with a writing mechanism, an operating-bar constructed to be actuated by said writing mechanism, ribbon-carriers disposed contiguous to said writing mechanism, ribbon-feed mechanism constructed to be actuated by said operating-bar to feed the ribbon over the printing-point, means for shifting the ribbons widthwise, a ribbon-guide connecting with said operating-bar and constructed to be actuated thereby to vibrate the ribbon-guide to and away from the printing-point, and means for horizontally shifting the ribbon-guide in unison with the shifting of the ribbons widthwise.

46. In a type-writer, the combination with a writing mechanism, an operating-bar constructed to be actuated by said writing mechanism, ribbon-carriers disposed contiguous to said writing mechanism, ribbon-feed mechanism constructed to be actuated by said operating-bar to feed the ribbon over the printing-point, means for shifting the ribbons widthwise, a vertically-vibrating hinged ribbon-guide connecting with said operating-bar and constructed to be actuated thereby to vibrate the ribbon-guide to and away from the printing-point, and means for horizontally shifting the ribbon-guide in unison with the shifting of the ribbons widthwise.

47. In a type-writer, the combination with a writing mechanism, of ribbon-carriers disposed at opposite sides thereof, an operating-bar constructed to be actuated by said writing mechanism, ribbon-feeding mechanism deriving movement from the operation of said operating-bar to effect winding of the ribbon upon a ribbon-carrier, carrier-supporting members, means for shifting said members to shift the ribbons widthwise, a ribbon-guide also deriving a vibratory movement from the actuation of said operating-bar, and means for shifting said ribbon-guide in unison with the shifting of said supporting member.

48. In a type-writer, the combination with writing mechanism, of an operating-bar constructed to be operated by the writing mechanism, ribbon-carriers, means for rotating said carriers to feed the ribbon and deriving movement from the actuation of said operating-bar, a slidable member upon which each of said carriers is disposed, means for shifting said slidable member to shift the ribbon widthwise, means for reversing the feed of the ribbon, a ribbon shifting and lifting guide also constructed to derive a lifting motion from the actuation of said operating-bar, and means for shifting the ribbon-guide horizontally in unison with the shifting of the supporting member.

49. In a type-writer, the combination with a writing mechanism, of an operating-bar constructed to be actuated thereby, ribbon-carriers, ribbon-feeding mechanism deriving movement from the actuation of the operating-bar, a vertically-vibrating ribbon-guide positioned normally away from the printing-point and constructed to derive movement from the actuation of the operating-bar to move said guide to the printing-point, and means for simultaneously shifting the ribbon-carriers and the ribbon-guide horizontally to shift the ribbon widthwise independent of the feeding of the ribbon.

50. In ribbon mechanism for type-writers, the combination with ribbon-carriers, of a ribbon-feeding mechanism comprising a supporting member, a ratchet-wheel disposed thereon, a reciprocating feed-pawl-supporting plate, a feeding-pawl disposed on and movable with said plate, a feed-lever connecting with and constructed to oscillate said plate, and a vibrating operating-bar with which said feed-lever connects.

51. In ribbon mechanism for type-writers, the combinaiton with a ribbon-carrier, of a ribbon-feeding mechanism comprising a supporting member, a ratchet-wheel disposed thereon, a reciprocating feed-pawl-supporting plate, a feeding-pawl disposed on and movable with said plate, a feed-lever connecting with and constructed to oscillate said plate, a vibrating operating-bar with which said feed-lever connects, a feed-reversing mechanism comprising a slidable block upon which said feeding-pawl-supporting plate is mounted, a rocking arm connecting with and constructed to move said slidable block, a cam member with which said rocking arm engages, and means for swinging said cam member.

52. In ribbon mechanism for type-writers, the combination with a ribbon-carrier, of a ribbon-feeding mechanism comprising a supporting member, a ratchet-wheel disposed thereon, a reciprocating feed-pawl-supporting plate, a feeding-pawl disposed on and movable with said plate, a feed-lever connecting with and constructed to reciprocate said plate, a vibrating operating-bar with which said feed-lever connects, a feed-reversing mechanism comprising a slidable block upon which said feeding-pawl-supporting plate is mounted, a rocking arm connecting with and constructed to move said slidable block, a cam member with which said rocking arm engages, means for swinging said cam member, and ribbon-shifting mechanism comprising a bell-crank lever engaging the said supporting member and said cam member.

53. In a type-writer, the combination with a slidable supporting member, a ribbon-carrier disposed thereon, means for shifting said slidable member horizontally, a vertically-vibrating ribbon-guide, a slidable plate upon which said guide is pivoted, a post disposed on said slidable plate, an operating-bar, connections between said operating-bar and said ribbon-guide, a rotatable shaft member, an arm connecting said post and said shaft member and constructed to be moved by said shaft member to shift said slidable plate, an arm for rotating said shaft member, and means for retaining said arm at the desired position.

54. In a writing-machine, the combination with a platen, and writing mechanism comprising downwardly-acting type-bars, of ribbon-carriers for sustaining a ribbon, ratchet-wheels disposed contiguous thereto, an operating-bar arranged in juxtaposition to the writing mechanism and adapted to have movement imparted to it thereby at each operation of said writing mechanism, means adapted to receive movement by the actuation of said operating-bar for effecting complete feeding of the ribbon during the descent of a type-bar to the platen and prior to the impact of the bar upon the platen.

55. In a writing-machine, the combination with a platen, and writing mechanism comprising downwardly-acting type-bars, of ribbon-carriers for sustaining a ribbon, ratchet-wheels disposed contiguous thereto, an operating-bar arranged in juxtaposition to the writing mechanism and adapted to have movement imparted to it thereby at each operation of said writing mechanism, means adapted to receive movement by the actuation of said operating-bar for effecting feeding of the ribbon during the descent of a type-bar to the platen and prior to the impact of the bar upon the platen, and means for disengaging said feeding means to stop such feeding of the ribbon at the moment of impact of the type-bar upon the platen.

56. In a writing-machine, the combination with carriers adapted to sustain a ribbon element constituted of a plurality of differentiated portions, each portion being constructed of a width sufficient to present a plurality of writing-paths longitudinal of the ribbon, means for rotating said carriers to feed the ribbon lengthwise, means constructed to shift said ribbon widthwise to a predetermined point for presenting one or another of said colored portions over the printing-point and, simultaneously, to effect reversal of the feed, and means constructed to shift said ribbon widthwise to a position beyond its first shifted point and thereby position the operating parts without effecting reversal of the feed.

57. In a writing-machine, the combination with carriers adapted to carry a ribbon constituted of two different color portions or stripes extending longitudinally of the ribbon, each of said stripes comprising two longitudinal writing-paths, means for rotating said carriers to feed the ribbon lengthwise, means constructed to shift said ribbon widthwise and position a different color portion over the printing-point, and means constructed and arranged to shift the ribbon widthwise and position a different writing-path of the same color portion at the writing-point and, simultaneously, to effect reversal of the feed.

58. In a writing-machine, the combination with carriers adapted to carry a ribbon constituted of two different color portions or stripes extending longitudinally of the ribbon, each of said stripes comprising two longitudinal writing-paths, means for rotating said carriers to feed the ribbon lengthwise, and means constructed to reverse the feed of the ribbon and, simultaneously, shift the ribbon widthwise without removing the color portion away from the printing-point.

59. In a writing-machine, the combination with carriers adapted to carry a ribbon constituted of two different color portions or stripes extending longitudinally of the ribbon, each of said stripes comprising two longitudinal writing-paths, means for rotating said carriers to feed the ribbon lengthwise, means constructed to shift said ribbon widthwise and position a different color portion over the printing-point, means constructed and arranged to shift the ribbon widthwise and position a different writing-path of the same color portion at the writing-point and, simultaneously, to effect reversal of the feed, a ribbon-guide, and means constructed to shift the same simultaneously with the shifting of the ribbon.

60. In a writing-machine, the combination with writing mechanism comprising typebars and key-levers, of ribbon-carriers, means for rotating the same to effect feed of the ribbon, an automatically-operated ribbon-guide adapted to be oscillated at each actuation of the key-levers toward and away from the printing-point, and means constructed to hold the ribbon-carriers against rotation during operation of said ribbon-guide.

61. In a writing-machine, the combination with ribbon-carriers, a shiftable supporting member adapted to support said carriers, ribbons disposed on said carriers, means constructed to rotate said carriers to feed the ribbons, means constructed to reverse the feed of the ribbons, and idler members disposed contiguous to the carriers and adapted to guide the ribbon therefrom during its feed.

62. In a writing-machine, the combination with ribbon-carriers, a shiftable supporting member adapted to support said carriers, ribbons disposed on said carriers, means constructed to rotate said carriers to feed the ribbons, means constructed to reverse the feed of the ribbons, a ribbon-guide, and ribbon-feed-guide means disposed contiguous to the carriers and constructed to position the ribbon in a plane relative to that of the ribbon-guide.

63. In ribbon mechanism, the combination with a slidable supporting member, ribbon-carriers removably supported thereon, ratchet-wheels arranged independent of, but connecting with, the carriers, means for rotating said ribbon-carriers, and a shiftable and oscillating ribbon-guide.

64. In a ribbon mechanism, the combination of a ribbon-carrier rotatable for ribbon-feed and shiftable axially, a feed-reversing member, and a cam-surface provided with a plurality of stations governing successive feed reversals and engaged by said feed-reversing member during shifting of the ribbon-carrier.

65. In a ribbon mechanism, the combination of a rotatable ribbon-carrier, and a shiftable carrier-support; of a feed-reversing member, and a cam-surface provided with a plurality of stations governing successive feed reversals and engaged by said feed-reversing member during shifting of the carrier-support.

66. In a ribbon mechanism, the combination of a ribbon-carrier rotatable for ribbon-feed and shiftable axially, a feed-reversing member, a cam-surface engaged by said member and provided with a plurality of stations governing successive feed reversals, and common means for simultaneously shifting the ribbon-carrier and cam-surface.

67. In a ribbon mechanism, the combination of a rotatable and axially-shiftable ribbon-carrier, a feed-reversing member, a cam-surface provided with a plurality of stations governing successive feed reversals, common operating means for shifting the ribbon-carrier and moving said cam-surface to bring said stations into engagement with the feed-reversing member, and means for locking said operating means at points of feed reversal.

68. In a ribbon mechanism, the combination of a rotatable ribbon-carrier, a ribbon-carrier support shiftable axially of said carrier, a cam-surface, a support-shifting member connecting said support and said cam-surface, a second cam-surface provided with a plurality of stations governing feed reversal, a feed-reversing member engaging such cam-surface, and common operating means for causing said feed-reversing member to engage said stations successively as said support-shifting member passes along the other cam-surface.

69. In a ribbon mechanism, the combination of a ribbon-carrier rotatable for ribbon-feed, a shiftable ribbon-carrier support, support-shifting means, a cam-surface provided with a plurality of stations governing feed reversal, a feed-reversing member engaging such surface, and means for causing said feed-reversing member to engage a plurality of said stations during the shifting of the carrier-support in one direction.

70. In a ribbon mechanism, the combination of a rotatable ribbon-carrier shiftable axially to any one of a number of predetermined points, a feed-reversing member, and a cam-surface provided with a plurality of stations governing feed reversal, said stations being engaged successively by said feed-reversing member as the ribbon-carrier assumes its several shifted positions.

71. In a ribbon mechanism, the combination of a rotatable ribbon-carrier shiftable axially to any one of a number of predetermined points, a feed-reversing member, a movable cam-surface engaged by said feed-reversing member and provided with a plurality of stations governing feed reversal, and means for moving said cam-surface to cause said feed-reversing member to engage said stations successively as the ribbon-carrier assumes its several shifted positions.

72. In a ribbon mechanism, the combination of a ribbon-carrier rotatable for ribbon-feed and shiftable axially, means for locking said carrier against axial movement at any one of a number of predetermined points, a feed-reversing member, a cam-surface engaged by said member and provided with a plurality of stations governing feed reversal, and common means for shifting said ribbon-carrier and during such shifting causing the feed-reversing member to engage said stations successively as the ribbon-carrier reaches said predetermined points.

73. In a ribbon mechanism, the combination of a rotatable ribbon-carrier, a ribbon-carrier support shiftable axially of said carrier, a swinging cam member having a camway, a support-shifting member connecting said carrier-support and said camway, said cam member being provided with a second camway having a plurality of stations governing successive feed reversal, and a feed-reversing member engaging said second camway and arranged to occupy said stations successively as the support-shifting member passes along the other camway.

74. In a ribbon mechanism, the combination of a rotatable ribbon-carrier, a shiftable carrier-support, a swinging cam member having a camway, a bell-crank lever connecting said carrier-support and said camway, said cam member being provided with a second camway having a plurality of stations governing feed reversal, and a feed-reversing lever engaging said second camway and arranged to occupy said stations successively as the bell-crank lever passes along the other camway.

75. In a ribbon mechanism, the combination of ribbon-carriers, feeding mechanism, feed-reversing mechanism, and means connected with the feed-reversing mechanism for shifting the ribbon widthwise from one rest position to another without reversing the feed.

76. In a ribbon mechanism, the combination of rotatable ribbon-carriers, feeding mechanism, feed-reversing mechanism, and means connected with the feed-reversing mechanism for shifting said carriers axially from one rest position to another without reversing the feed.

77. In a type-writer, ribbon-carriers, feeding mechanism therefor, a movable ribbon-guide disposed independent of the ribbon-carriers for positioning the ribbon at the printing-point, and means for effecting widthwise shifting of the carriers and simultaneously therewith of the movable ribbon-guide.

78. In a type-writer, ribbon-carriers, feeding mechanism therefor, a ribbon-guide for positioning the ribbon at the printing-point, means for oscillating the guide to and away from the printing-point, and means for shifting the ribbon-carriers and guide to any one of a plurality of operating positions.

79. In a type-writer, shiftable ribbon-carriers, means for effecting feeding thereof, means for effecting reversing of such feeding, a ribbon-guide, means for effecting positioning of the guide at and away from the printing-point, means for bodily shifting the ribbon-carriers, and means for shifting the ribbon-guide.

80. In a type-writer, ribbon-carriers, a multicolored ribbon carried thereby and each color thereof constituted of a width to present a plurality of paths, means for feeding said ribbon between its carriers, means for reversing such feed, means for bodily shifting the ribbon-carriers widthwise to present a different path of the ribbon along a line parallel with the printing-point and simultaneously effecting a reversal of the feed, the means for effecting bodily shifting of the ribbon widthwise to present a different color at the printing-point being constructed to effect such function without reversing the feed.

81. In a type-writer, shiftable ribbon-carriers, a multicolored ribbon carried thereby and each color thereof constituted of a width to present a plurality of paths, means for feeding said ribbon between its carriers, means for reversing such feed, means for bodily shifting the ribbon-carriers to present a different path of the ribbon at the printing-point and simultaneously to effect a reversal of the feed, and means, distinct from the carrier-shifting means, acting at the printing-point to present a different color thereover and constructed to effect such function without reversing the feed, and means for maintaining the parts in such shifted positions.

82. In a type-writer, ribbon-carriers, a multicolored ribbon carried thereby and each color constituted of a width to present a plurality of paths, means for feeding said ribbon between its carriers, means for reversing such feed, means for shifting the ribbon-carriers to present a different path at the printing-point and simultaneously to effect a reversal of the feed, means, distinct from the carrier-shifting means, acting at the printing-point to effect shifting of the ribbon widthwise to present a different color at the printing-point and constructed to present such different color without reversing the feed, and means for limiting the shifting.

83. In a type-writer, ribbon-carriers shiftable to a plurality of operating positions, rotating mechanism engaging therewith, means for effecting operation of such rotating mechanism, means for effecting disengagement of the operating means from the rotating mechanism, a universal bar, connections between said bar and the rotating mechanism, means for shifting the carriers to, and retaining the same in, one of the plurality of operating positions, means constructed and arranged to effect temporary checking of the operation of the rotating mechanism, and means for slacking the ribbon between carriers at such moment.

84. In a type-writer, a ribbon-carrier shiftable to different rest positions, a slide member upon which said carrier is rotatably and slidably supported, means for effecting reciprocation of said slide member to position the carrier in one or another of its rest positions, means also carried by said slide member for effecting rotation of the carrier, and means, independent of said slide member, for effecting operating of said rotating means.

85. In a type-writer, a ribbon-carrier, a slide upon which the carrier is rotatably mounted, means for reciprocating said slide to position the carrier in any one of a plurality of positions, comprising a cam-plate, a lever connecting with said cam-plate and said slide, means for effecting movement of the cam-plate, consisting of an arm, a shaft member to which said arm is secured, a shifting-lever device carried on said shaft, and means for regulating the shift of said lever device.

86. In a type-writer, a ribbon-carrier, a slide upon which the carrier is rotatably mounted, means for reciprocating said slide to position the carrier in any one of a plurality of positions, comprising a cam-plate, a lever connected with said cam-plate and said slide, means for effecting movement of said cam-plate, consisting of an arm, a shaft to which said arm is secured, a shifting-lever device carried on said shaft, and means for locking said shifting-lever device in position.

87. In a type-writer, a ribbon-carrier, a slide upon which the carrier is rotatably mounted, means for effecting rotation of said carrier to feed the ribbon, and means for effecting reversal of the feed comprising a rocker-lever fulcrumed on the slide, a cam-plate connecting with said rocker-lever, a shiftable plate slidable on said slide, and connections between said rocker-lever and said shiftable plate.

88. In a type-writer, printing mechanism, means for actuating the same, ribbon-carriers, ribbons carried thereby, feeding mechanism therefor, means for governing operation of the feeding mechanism and constructed to retard and stop movement of the ribbon at the printing-point, when said printing mechanism is operated to print.

In testimony whereof I affix my signature in the presence of two subscribing witnesses.

GEO. W. DUNNING.

Witnesses:
J. G. PETERSON,
E. C. WALTER.